Feb. 2, 1932.  A. MOORE  1,843,646
BOOSTING SYSTEM FOR INTERNAL COMBUSTION ENGINE CHARGES
Filed April 29, 1925  4 Sheets-Sheet 1
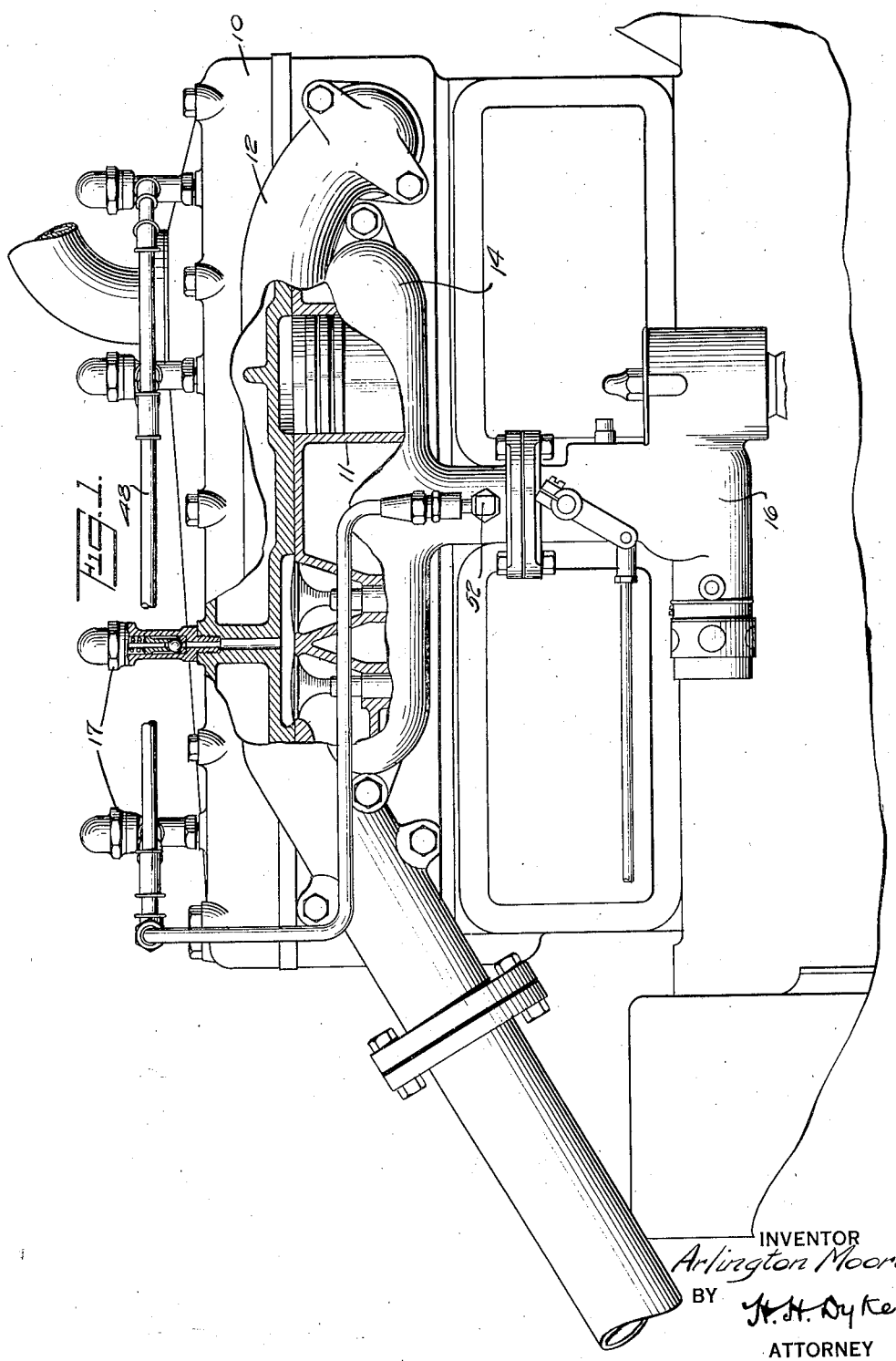
INVENTOR
Arlington Moore
BY H. H. Dyke
ATTORNEY

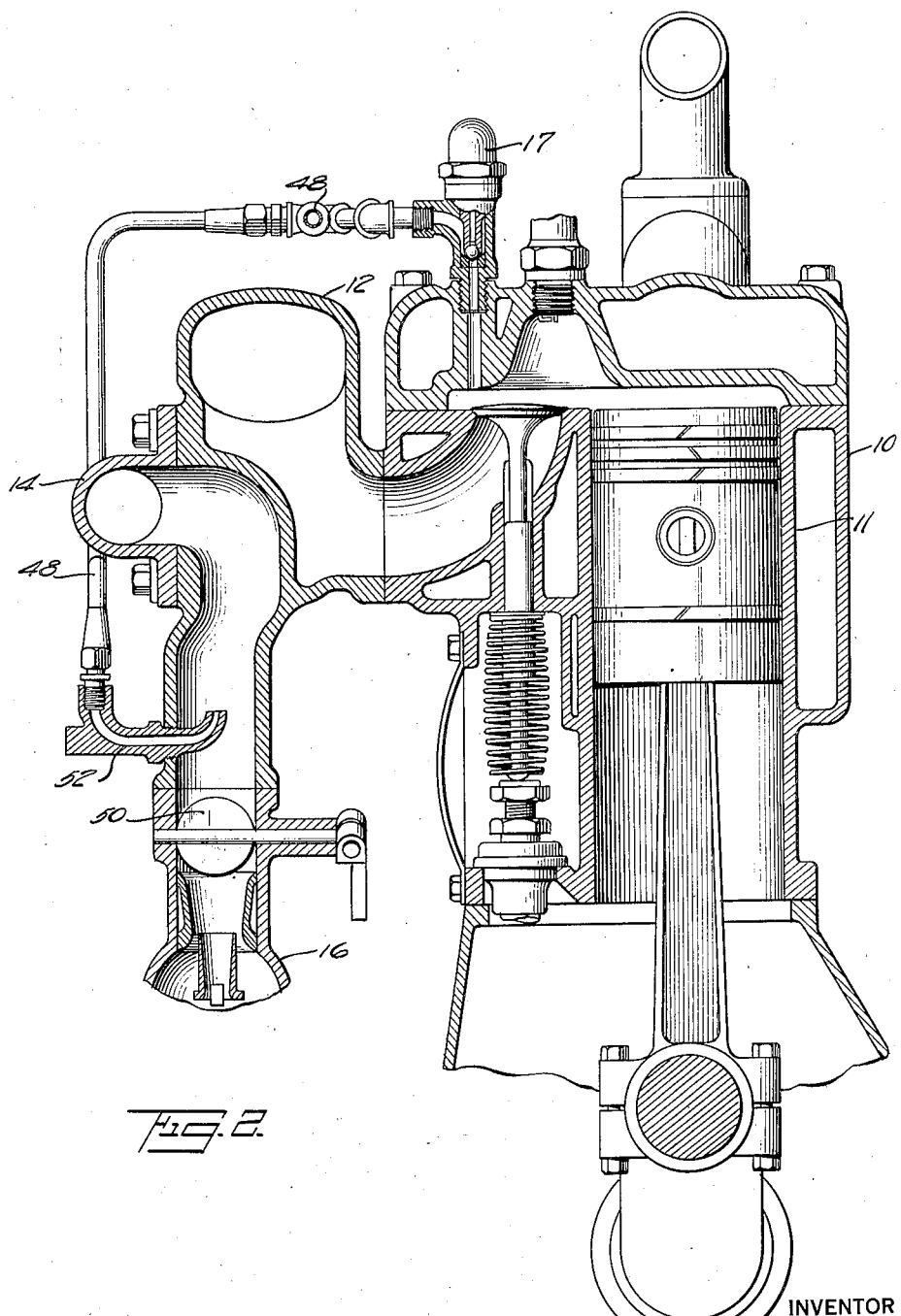

Feb. 2, 1932.  A. MOORE  1,843,646
BOOSTING SYSTEM FOR INTERNAL COMBUSTION ENGINE CHARGES
Filed April 29, 1925   4 Sheets-Sheet 3
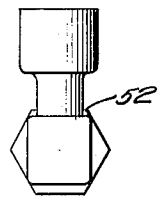
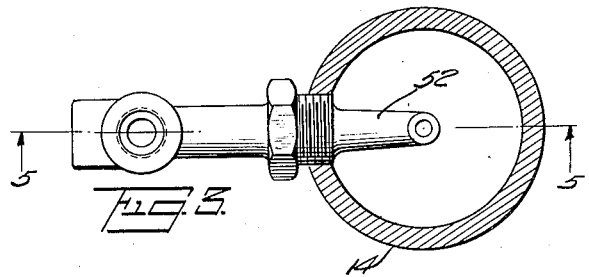
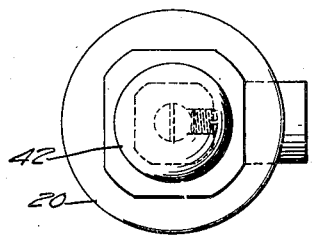
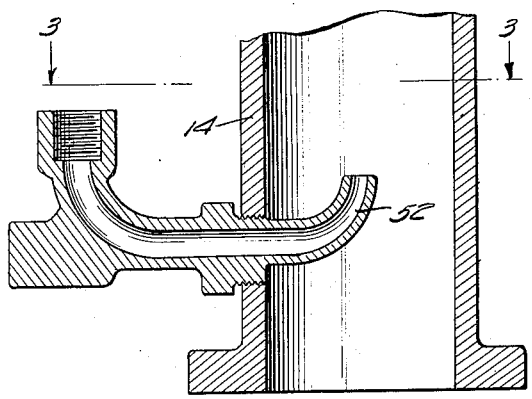
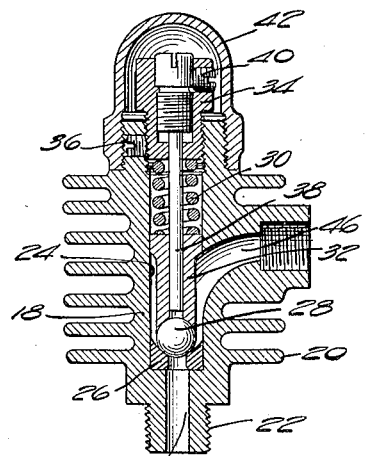
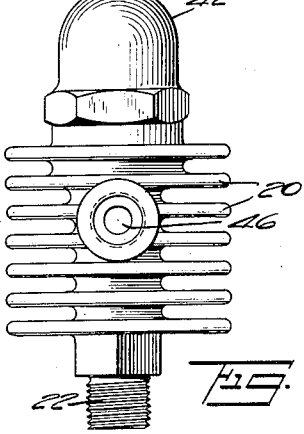
INVENTOR
Arlington Moore
BY
H. H. Dyke
ATTORNEY Feb. 2, 1932. A. MOORE 1,843,646
BOOSTING SYSTEM FOR INTERNAL COMBUSTION ENGINE CHARGES
Filed April 29, 1925 4 Sheets-Sheet 4
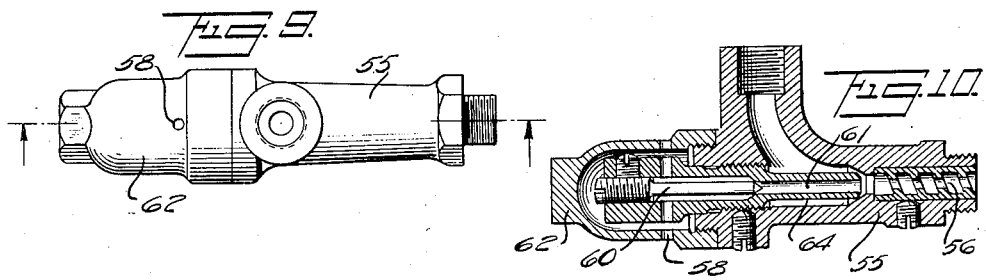
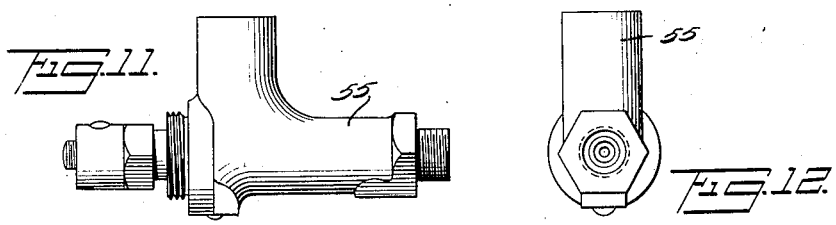
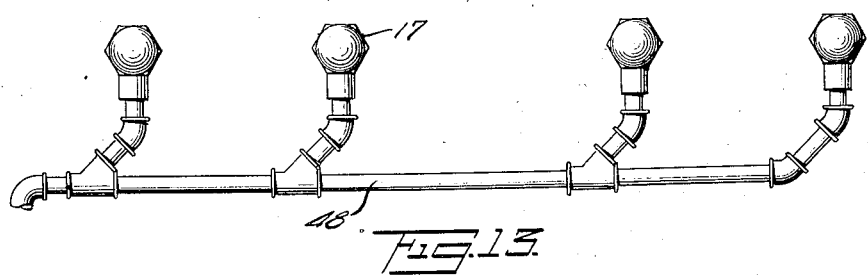
INVENTOR
Arlington Moore
BY H. H. Dyke
ATTORNEY Patented Feb. 2, 1932

1,843,646

UNITED STATES PATENT OFFICE

ARLINGTON MOORE, OF NEW YORK, N. Y., ASSIGNOR, BY MESNE ASSIGNMENTS, TO MAXMOOR CORPORATION, A CORPORATION OF DELAWARE

BOOSTING SYSTEM FOR INTERNAL COMBUSTION ENGINE CHARGES

Application filed April 29, 1925. Serial No. 26,618.

My invention is of a system for boosting the charges of a multiple cylinder internal combustion engine by a portion of the gases from the engine cylinders.

The invention is of special application to high compression engines in which the ratio of total cylinder volume to the compression space volume is in excess of 4½ : 1. In such engines of the Otto type operation at and toward open throttle is accompanied by pronounced detonation, particularly at heavy loads. My improved system permits use of high compressions without detonation, which is avoided in two ways, first, by relief of the extremely high cylinder pressures which are characteristic of detonation and, second, by the injecting or boosting of the incoming charge with the relieved cylinder gases at high temperatures and pressures, whereby the charge is effectively vaporized into dry gas and has mingled therewith gases of combustion including carbon dioxide in quantity which, while sufficient to delay the speed of flame propagation and thereby to minimize detonation, is not so great as to cause undue dilution of the charge with accompanying substantial loss of power.

In the accompanying drawings I have illustrated apparatus for operating a multi cylinder internal combustion engine in accordance with my improved system.

In said drawings, Fig. 1 is a side view of a multiple cylinder internal combustion engine with parts broken away and equipped with apparatus in accordance with my improved system. Fig. 2 is an enlarged sectional detail view showing the operation of the system. Figs. 3, 4 and 5 are detail views of one form of means for injecting cylinder gases into the intake in the direction of gas flow therein. Figs. 6, 7 and 8 are respectively plan, front and longitudinal sectional views of the pressure relief valve applied to the engine cylinders, preferably in the pet cock holes. Figs. 9, 10, 11 and 12 are respectively plan, longitudinal sectional front and end detail views of a modified form of intake injector with spiral discharge and with provision for regulated admission of air. Fig. 13 is a plan view of the high pressure relief gas manifold for a four cylinder engine.

The engine 10 has the customary cylinders 11, exhaust manifold 12, intake manifold 14 and carburetor 16.

One or more, preferably each, of the cylinders are provided with a pressure relief valve 17 set to work at pressures substantially in excess of the highest compression pressure. Same may be of any preferred form but, as shown, comprise a casing 18 with cooling means shown as air fins 20, and means for connecting to the engine cylinder as the threaded neck 22. Bore 24 of casing 18 is provided with a valve seat 26 for the preferably ball valve 28, to which pressure is transmitted from spring 30 by the follower 32.

The tension on spring 30 is adjusted by the screw plug 34 and plug 34 is locked by lock screw 36.

The extent of opening of valve 28 is controlled by the stop pin 38 having a screw adjustment in plug 34 and locked by the lock screw 40. A cap 42 may be screwed over the casing 18 to enclose the parts and minimize tampering therewith after once set.

The bore 24 of casing 18 communicating with the interior of the cylinder through the passage 44 has an outlet at 46 for gases passing valve 28. By independently adjusting the pins 38, and also the springs 30 the valve openings may be controlled to maintain substantially identical pressures in the several cylinders to insure smooth engine operation.

The outlets 46 of the various relief valves are connected to the common conduit or manifold 48 (Fig. 13) and this conduit has its discharge into the intake manifold 14 beyond the engine throttle, that is to say, between the throttle 50 (Fig. 2) and the engine cylinders. The gases are discharged continuously or without interruption into the intake over the range of explosion pressures determined by the adjustments made under a pressure which varies directly as a function of the mean cylinder pressure, which in turn varies as a function of the weight of charge entering the cylinders controlled by throttle 50. Hence, the intensity of the boosting and homogenizing action increases with the weight of charge entering the cylinders, as controlled by the throttle. The length and exposure to air of this third manifold 48 is such that flame does not get to the fuel charges and ignite same in the intake. If desired, flame retarding screens may be introduced, particularly in the larger sizes of engines.

Such discharge in the intake is preferably directed in the direction of gas flow in the intake passage to the cylinders. In Figs. 2, 3, 4 and 5 I have shown a curved delivery nozzle 52 screwed through the wall of intake manifold 14 and connected (Fig. 2) with the manifold 48. Such nozzle directed toward the cylinders serves upon discharge of cylinder gases therefrom to boost and supplement the incoming charge delivered by the carburetor.

In Figs. 9–12 I have shown a modified form of nozzle 55 for delivery of cylinder gases to the intake. This nozzle has the spiral discharge orifice 56 and may, if desired, be supplied with a regulated quantity of air drawn in through aperture 58 past the adjustable and lockable needle valve 60 and delivered through the injection passage 61 to pass out through the rifled orifice 56 with the cylinder gases to the intake. The cyclonic stream of hot gas issuing from the rifled orifice 56 serves to secure extremely high turbulence and effective gas admixture in the intake passage. As in the case of relief valves 17, a cap 62 may be screwed on the delivery member 55. The air nozzle 64 containing passage 61 is preferably screw adjustable as in the case of screw plug 34 as shown in Fig. 10.

The spring 30 and stop 38 being set for the particular engine nothing happens until the pressures on the power stroke exceed the pressure for which the relief valve is set. When they do, the explosion waves are to some extent reduced and relieved by a portion of the power stroke gases passing the valves 28 and being delivered to the engine intake in which the vacuum or suction is low, the throttle being at or toward its open position. These gases, supplied under pressure and at a high temperature and the pressure thereof not being fully relieved until they reach the intake manifold through the relatively slender conduit 48, serve to boost and supplement and deliver high heat to the gases delivered to the intake by the carburetor, and detonation is avoided and high efficiency in operation obtained. Should the engine be operating under heavy load and, therefore, at relatively low speed, the pressure at which the highly heated gases are supplied is of marked advantage in supercharging and securing fully charged cylinders, whereas at higher speeds with consequent great rapidity and quantity of charge flow the high heat of the cylinder gases—greatly in excess of the temperatures to be found in the exhaust manifold 12—is effective in securing thoroughly gasified charge material as well as in securing fully charged cylinders.

Should an unduly high amount of heat be supplied by the gases released and bypassed to prevent detonation as, for example, in seasons of high atmospheric temperature, the gases may be cooled to the requisite extent by admixture of air therewith prior to delivery to the intake pipe. Air may be admitted at other times, if desired.

I claim:

1. In a multiple cylinder internal combustion engine, pressure relief valves in communication with the space within the cylinders above the piston, said valves being operable to open to limited extents at pressures substantially in excess of those of maximum compression to permit of the passage of limited quantities of gases at such pressures substantially to the exclusion of the gases at lesser pressures, and a common conduit for gases passing said valves leading to the engine intake beyond the engine throttle and delivering said gases into the intake during normal operation of the engine without interruption in the direction of gas flow toward the cylinders.

2. In a multi-cylinder internal combustion engine of the Otto type comprising the usual intake and exhaust manifolds and carburetor, an auxiliary check valved passage from engine cylinders to intake above the throttle, and regulable means for injecting air into said auxiliary passage.

3. In a multi-cylinder internal combustion engine of the Otto type comprising the usual intake and exhaust manifolds and carburetor, an auxiliary passage leading from engine cylinders to intake manifolds beyond the throttle, a spring check valve for each cylinder communicating with said auxiliary passage, and means for adjusting the tension on the check valve spring to prevent opening of the valve except at pressures substantially in excess of those of compression.

4. In a multi-cylinder internal combustion engine of the Otto type comprising the usual intake and exhaust manifolds and carburetor, an auxiliary passage leading from engine cylinders to intake manifold beyond the throttle, a spring check valve for each cylinder communicating with said auxiliary passage, means for adjusting the tension on the check valve spring to prevent opening of the valve except at pressures substantially in excess of those of compression, and adjustable means for limiting the extent of opening of the check valve to prevent appreciable loss of power.

5. In a multiple cylinder internal combustion engine of the four stroke cycle type and having exhaust and intake conduits, a carburetor and a throttle, an auxiliary conduit comprising a manifold leading from each of the engine cylinders above the piston head and delivering the gases therefrom without interruption to the engine intake above the throttle in the direction of stream flow therein, and spring check valves in the passages from the cylinders to the auxiliary conduit manifold, the check valves being operable to open against their springs only at pressures greater than those of compression in the engine cylinders, whereby excess cylinder pressures on the power stroke are somewhat relieved, the movement of the charge stream toward the cylinders is accelerated, and a material quantity of inert gases is added to the charge.

6. In an internal combustion engine, an intake conduit, a fuel jet therein, a throttle therein above the fuel jet, a passage from an engine cylinder above the piston to said intake conduit above the throttle for the delivery thereto of the cylinder gases under compression without unduly affecting the fuel metering characteristics of said jet, and means for imparting a cyclonic movement to the cylinder gases entering the intake conduit, whereby turbulence is created in the gaseous flow to the cylinders.

7. In an internal combustion engine an intake conduit, a fuel jet therein, a throttle therein above the fuel jet, a common passage leading from certain of the engine cylinders above the piston to said intake conduit above the throttle for the delivery thereto of a portion of the cylinder gases under compression, a check valve for each cylinder controlling said passage, and means for imparting a cyclonic movement to the cylinder gases entering the intake conduit, whereby turbulence is created in the gaseous flow to the cylinders.

8. The hereindescribed process which consists in taking gases in limited quantities from certain of the cylinders of an internal combustion engine at pressures developed therein during normal engine operation substantially in excess of those of compression to the exclusion of the gases at lesser pressures, and continuously discharging said high pressure gases into the air stream passing towards the cylinders for increasing the air flow.

9. The hereindescribed process which consists in taking gases containing products of combustion in limited quantities from certain of the cylinders of an internal combustion engine at pressures developed therein during normal engine operation substantially greater than the average pressure within the cylinder to the exclusion of the gases at pressures below said average, and subjecting the air and fuel passing to the cylinders to the action of said cylinder gases by continuously discharging the latter into the air stream in the direction of flow thereof, whereby to promote the charge flow, homogenize the components thereof and reduce detonation by the addition of inert constituents to the charge.

10. The hereindescribed process which consists in taking gases in limited quantities from certain of the cylinders of an internal combustion engine at pressures developed therein during normal engine operation substantially in excess of those of compression to the exclusion of the gases at lesser pressures, controlling the flow of air and fuel to the several cylinders, and continuously subjecting the fuel and air beyond the point of control thereof to the action of a stream of said high pressure gases for producing a homogeneous mixture of fuel and air.

11. The hereindescribed process which consists in taking gases in limited quantities from the several cylinders of an internal combustion engine at pressures developed therein during normal engine operation substantially in excess of those of compression to the exclusion of the gases at lesser pressures, and discharging said high pressure gases as a substantially continuous stream into the air stream to the engine cylinders for increasing the air flow.

12. The herein described process which consists in taking gases in limited quantities from certain of the cylinders of an internal combustion engine at pressures substantially in excess of those of compression to the exclusion of the gases at lesser pressures, whereby to relieve the pressures on the power stroke for reducing detonation, and continuously subjecting the fuel and air passing to the cylinders to the action of a stream of said high pressure gases containing products of combustion and nitrogen, whereby to produce a homogeneous mixture of the charge components, and add inert constituents to the charge for further reducing detonation.

13. In an internal combustion engine, an intake, a pressure relief valve in communication with the space within the cylinder over the piston head, said valve being open at pressures substantially in excess of those of compression and closed at lesser pressures, means for adjustably limiting the extent of opening of said valve, and means for introducing the gases passing said valve into said intake continuously into admixture with the air and fuel therein passing to the cylinders.

14. In an internal combustion engine, an intake, a throttle therein, a pressure relief valve in communication with the space within the cylinder over the piston head, said valve being open at pressures substantially in excess of those of compression, and means for introducing the gaseous products of combustion passing said valve into the intake beyond said throttle continuously, whereby to subject the fuel and air therein passing to the cylinders to the action of said cylinder gases under a pressure varying directly with the weight of charge for producing a homogeneous mixture.

15. In an internal combustion engine, an intake, a throttle therein, an auxiliary conduit extending from a cylinder above the piston head and delivering to said intake beyond the throttle in the direction of stream flow therein, and a pressure relief valve in said conduit operable to open at pressures substantially in excess of those of compression, whereby to relieve the cylinder pressures on the power stroke and pass the gases therefrom continuously through said conduit into the intake to increase the charge flow towards the cylinders, and add gaseous products of combustion to the charge for reducing detonation.

16. In a multiple cylinder internal combustion engine, an intake, pressure relief valves in communication with the space within the cylinders above the piston, said valves being open at pressures substantially in excess of those of compression, and a common conduit for conducting the gaseous products of combustion passing said valves continuously to said intake.

17. In a multiple cylinder internal combustion engine, an intake, pressure relief valves in communication with the space within the cylinders above the piston, said valves being open at pressures substantially in excess of those of compression, means for individually adjusting the limit of opening movement of each valve, and a common conduit for the gaseous products of combustion passing said valves leading to said intake.

18. In a multiple cylinder internal combustion engine, an intake, means for controlling the passage of fuel and air to said intake, pressure relief valves in communication with the space within the cylinders above the piston, said valves being open at pressures substantially in excess of those of compression and closed at lower pressures to permit of the passage thereby of cylinder gases containing products of combustion at pressures greater than the average cylinder pressure, and a common conduit leading from said several valves into said intake beyond the point of air and fuel control for conducting the gases thereto continuously, whereby to subject the air and fuel passing to the cylinders to the action of said cylinder gases varying in effectiveness directly with the charge weight, and produce a homogeneous mixture containing antidetonating constituents.

19. In a multiple cylinder internal combustion engine, an intake manifold, a throttle, pressure relief valves in communication with the space within the cylinders above the piston and adapted to permit outward passage of gases only when a predetermined pressure substantially in excess of maximum compression pressures is exceeded, and a conduit leading from said valves to the engine intake manifold beyond the engine throttle for conducting gases into the manifold continuously to augment flow therein, and produce a homogeneous charge mixture.

20. Apparatus in accordance with claim 19 having adjsutable means for limiting the extent of relief valve opening.

21. The hereindescribed process which consists in taking gases in limited quantities from certain of the cylinders of an internal combustion engine at pressures developed therein during normal engine operation substantially in excess of those of compression to the exclusion of the gases at lesser pressures, controlling the weight of charge passing to the engine cylinders, and discharging the stream of gases under a pressure continuously varying in direct relation to the weight of charge into the air stream in the direction of flow thereof for increasing said flow.

22. The hereindescribed process which consists in taking gases in limited quantities from the cylinders of an internal combustion engine at pressures developed therein during normal engine operation substantially in excess of those of compression to the exclusion of the gases at lesser pressures, discharging a stream of said gases into the air stream for augmenting the flow thereof and producing a homogenized mixture, and controlling the weight of charge passing to the cylinders and causing thereby the flow augmenting and homogenizing effect of said gases to continuously vary in direct relation to the charge weight variation.

23. The hereindescribed process which consists in taking gases in limited quantities from certain of the cylinders of an internal combustion engine at pressures developed therein during normal engine operation substantially in excess of those of compression to the exclusion of the gases at lesser pressures, controlling the weight of charge passing to the engine cylinders, and discharging a stream of said gases under a pressure continuously varying in direct relation to the weight of charge into the air stream for producing a homogenizing effect on the charge increasing with the weight thereof.

24. The hereindescribed process which consists in taking gases in limited quantities from certain of the cylinders of an internal combustion engine at pressures developed therein during normal engine operation substantially in excess of those of compression to the exclusion of the gases at lesser pressures, controlling the weight of charge passing to the engine cylinders, and discharging a stream of said gases under a pressure continuously varying in direct relation to the weight of charge into the air-steam at the region of reduced pressure beyond the point of charge weight control for producing a homogenizing effect on the charge increasing with the weight thereof.

25. In a multiple cylinder internal combustion engine, pressure relief valves in communication with the space between the cylinders above the piston and adapted to open to permit outward passage of gases when the pressures reach the higher values thereof during normal engine operation, means for independently adjusting the limit of opening of each valve to maintain substantially identical pressures in the cylinders for obtaining smooth engine operation, and a common conduit for conducting said gases from said relief valves.

26. In an internal combustion engine, an intake, a throttle for controlling the weight of charge passing to the cylinders, pressure relief valves in communication with the space within the cylinders above the piston, said valves being open at pressure substantially in excess of those of compression, and closed at lesser pressures during normal operation of the engine, means for independently adjusting the extent of opening of each pressure relief valve to obtain equal pressures in the cylinders to insure smooth engine operation, and a conduit leading from said pressure relief valves to said intake above the throttle and extending in the direction of flow in the intake for causing the gases discharged to homogenize the charge and promote the flow thereof, said conduit being open to allow passage of the gases continuously during the period of utilization thereof so that the kinetic energy thereof varies substantially as a direct function of the variations in charge weight resulting from throttle movement.

In testimony whereof, I have signed my name hereto.

ARLINGTON MOORE.